(12) United States Patent
Maeda

(10) Patent No.: US 6,272,085 B1
(45) Date of Patent: Aug. 7, 2001

(54) DATA RECORDING/REPRODUCING METHOD AND DEVICE

(75) Inventor: Satoshi Maeda, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/171,056

(22) PCT Filed: Feb. 16, 1998

(86) PCT No.: PCT/JP98/00627

§ 371 Date: Jun. 15, 1999

§ 102(e) Date: Jun. 15, 1999

(87) PCT Pub. No.: WO98/36414

PCT Pub. Date: Aug. 20, 1998

(30) Foreign Application Priority Data

Feb. 14, 1997 (JP) .................................................. 9-030630

(51) Int. Cl.⁷ ....................................................... G11B 7/00
(52) U.S. Cl. ................................... 369/53.17; 369/53.15; 369/47.14
(58) Field of Search .................................. 369/47, 48, 49, 369/50, 54, 58, 59, 32, 53.15, 53.12, 53.1, 53.16, 53.17, 53.2, 53.41, 47.1, 47.4

(56) References Cited

U.S. PATENT DOCUMENTS

| 5,235,585 | * | 8/1993 | Bish et al. | ......................... 369/58 X |
| 6,034,831 | * | 3/2000 | Dobbek et al. | ..................... 369/47 X |

FOREIGN PATENT DOCUMENTS

| 58-3104 | 1/1983 | (JP) . |
| 61-214280 | 9/1986 | (JP) . |
| 62-46468 | 2/1987 | (JP) . |
| 2-218068 | 8/1990 | (JP) . |
| 5-28646 | 2/1993 | (JP) . |
| 5-334017 | 12/1993 | (JP) . |
| 6-76480 | 3/1994 | (JP) . |
| 6-110619 | 4/1994 | (JP) . |
| 6-111479 | 4/1994 | (JP) . |

\* cited by examiner

*Primary Examiner*—Muhammad Edun
(74) *Attorney, Agent, or Firm*—Frommer Lawrence & Haug, LLP.; William S. Frommer; Glenn F. Savit

(57) ABSTRACT

Tracks of respective discs of plural disc drives are divided into plural blocks and spare sectors are disposed (assigned) at predetermined intervals between blocks. Moreover, blocks including defect sector is replaced so that sectors are continuously disposed (assigned) on the disc except for the defect sector in alternative area designated on the basis of defect list where address of detected defect sector is registered and correspondence relationship set in advance. At the time of reproduction of replaced data, all data within the read-designated range are continuously read out to store those data into a memory. In reading out data from the memory, data of defect sector is deleted. Further, at the time of recording, data are continuously written into the write-designated range. At this time, dummy data is written into the defect sector. Thus, there can be provided a data recording and/or reproducing method and a data recording and/or reproducing apparatus capable of carrying out defect processing without stopping all disc drives and adapted so that operation speed is not lowered after defect processing.

12 Claims, 15 Drawing Sheets

FIG.6A

RAID LOGIC ADDRESS MAPPING

| RAID SECTOR ADDRESS | SECTOR ADDRESSES OF RESPECTIVE HDDs | | | | | | |
|---|---|---|---|---|---|---|---|
| | $HDD_1$ | $HDD_2$ | $HDD_3$ | $HDD_4$ | $HDD_5$ | $HDD_6$ | $HDD_7$ |
| 1 | 4 | 4 | 4 | 4 | 4 | 4 | 4 |
| 2 | 5 | 5 | 5 | 5 | 5 | 5 | 5 |
| 3 | 6 | 6 | 6 | 6 | 6 | 6 | 6 |
| 4 | 7 | 7 | 7 | 7 | 7 | 7 | 7 |
| ... | | | | | | | |
| 16 | 22 | 22 | 22 | 22 | 22 | 22 | 22 |
| 17 | 23 | 23 | 23 | 23 | 23 | 23 | 23 |
| ... | | | | | | | |
| 30 | 36 | 36 | 36 | 36 | 36 | 36 | 36 |
| ... | | | | | | | |

FIG.6B

| HDD DEFECT LIST | |
|---|---|
| $HDD_1$ | |
| $HDD_2$ | |
| $HDD_3$ | |
| $HDD_4$ | |
| $HDD_5$ | |
| $HDD_6$ | |
| $HDD_7$ | |
| $HDD_8$ | |

FIG.6C

| HDD SPARE LIST | |
|---|---|
| $HDD_1$ | 1,2,3... |
| $HDD_2$ | 1,2,3... |
| $HDD_3$ | 1,2,3... |
| $HDD_4$ | 1,2,3... |
| $HDD_5$ | 1,2,3... |
| $HDD_6$ | 1,2,3... |
| $HDD_7$ | 1,2,3... |
| $HDD_8$ | 1,2,3... |

FIG.6D

| RAID DEFECT LIST |
|---|
| |

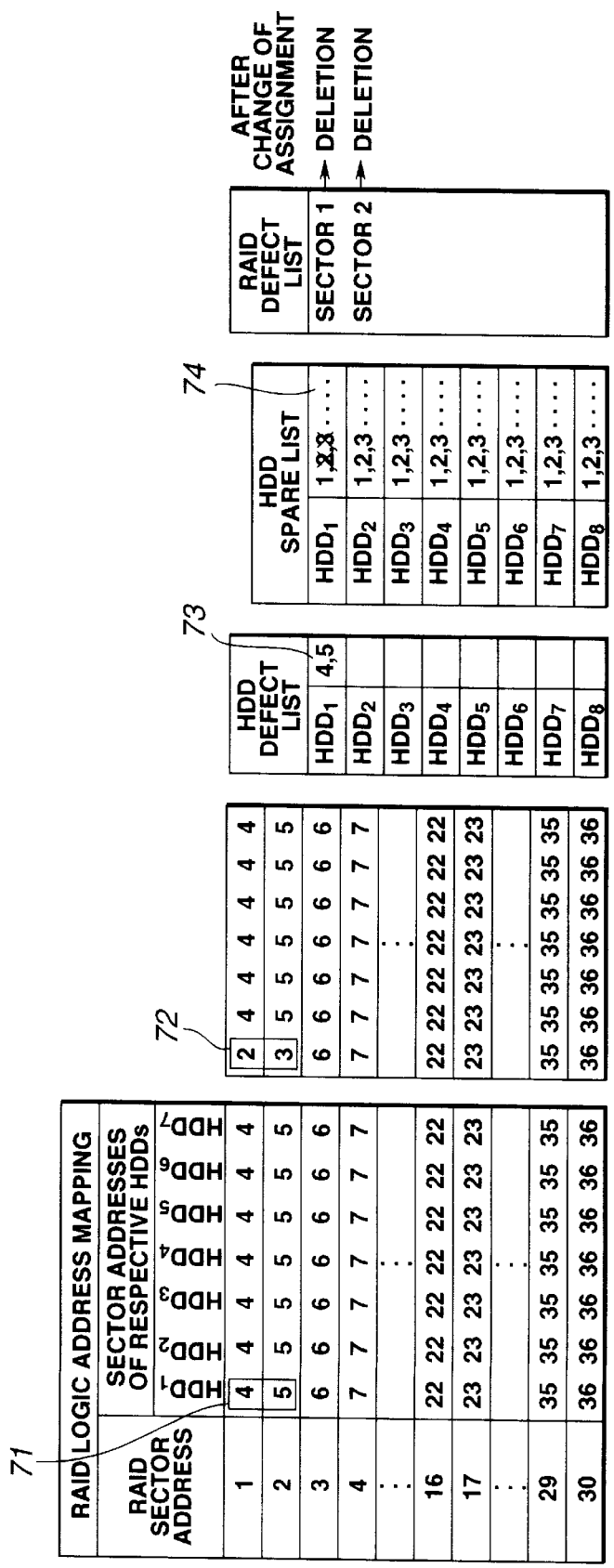

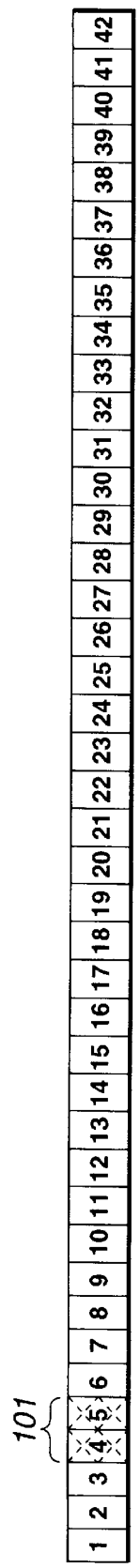
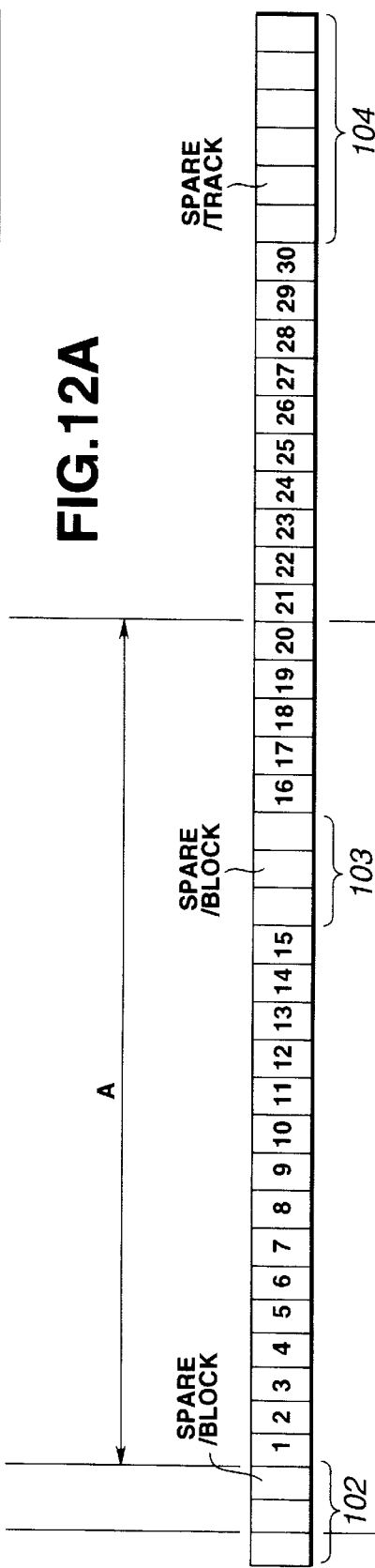
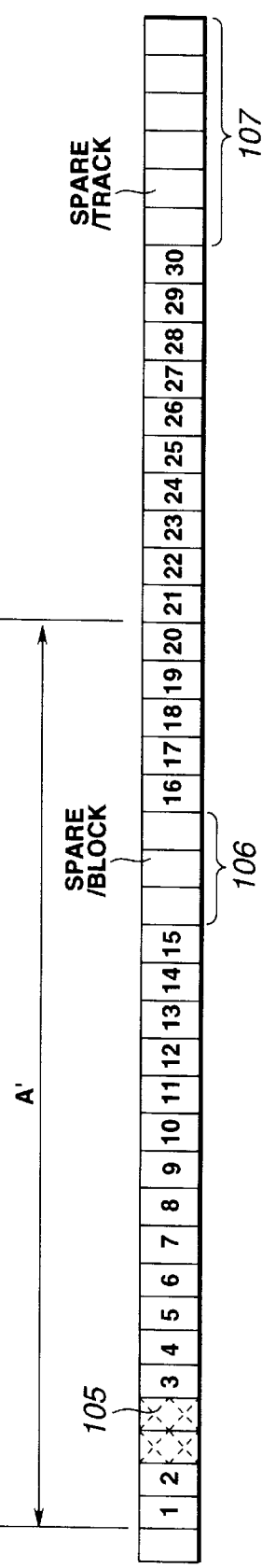
FIG.12A
FIG.12B
FIG.12C

DATA RECORDING/REPRODUCING METHOD AND DEVICE

TECHNICAL FIELD

This invention relates to a data recording and/or reproducing method and a data recording and/or reproducing apparatus adapted for recording and reproducing digital data with respect to plural disc units.

BACKGROUND ART

In recent years, with realization of multi-channel structure of information offer resulting from popularization of CATV (Cable Television), etc., there is being increased such a demand to record, at the same time, plural video/speech (sound) data, reproduce such data or reproduce such data while recording them from a single video/speech data recording and/or reproducing unit, etc. Further, in order to satisfy this demand, there is being popularized apparatuses called video server (or also called AV (Audio and/or Video) server adapted for recording and/or reproducing video (image) or speech (sound) by using random accessible recording medium such as hard disc, etc.

In general, the video server within the broadcasting station is required to have large capacity because transfer rate of required data is high and long time data is recorded from the requirement with respect to the picture quality and/or the sound quality. In view of the above, there have been carried out an attempt in which data recording and/or reproducing unit including plural hard disc (hereinafter referred to as HD) units adapted for storing video/speech data and capable of carrying out parallel processing is used to thereby realize high speed of transfer rate of data and large capacity, and an attempt in which parity data are recorded to thereby have ability of ensuring reliability even if any HD unit is caused to be out of order. Thus, there can be realized multi-channel video server which can cope with a wide variety of use forms such that even in the case where there are different numbers of channels required by the content of the program or the broadcasting form that the broadcasting station attempts to provide, material data consisting of plural speech/video data are recorded in a distributed manner to carry out, at the same time, sending of many channels, and/or the same material data is reproduced by m any channels with the reproduction time being shifted to thereby construct system such as VOD (Video On Demand) or NVOD (Near Video On Demand), etc.

In the data recording and/or reproducing apparatus used in such video server, there is used RAID (Redundant Arrays of Inexpensive Disks) technology constituted by plural hard disc drives (hereinafter each referred to as HDD) each consisting of plural HDs lectured by the article ("A Case for Redundant Arrays of Inexpensive Disks (RAID)", ACM SIGMOND Conference, Chicago, Ill., Jun. 1–3, 1988) announced by Patterson, etc. 1988.

In the above-mentioned article, RAID) is classified into five disc systems of RAID-1 to RAID-5. The RAID-1 is the system of writing the same content intc two HDDs. The RAID-3 is the system in which input data is divided into data of a predetermined length to record these data into plural HDDs, and to generate parity data which are exclusive logical sum of data blocks corresponding to each other of respective HDDs to write them into other respective one HDDs. Further, the RAID-5 is the system in which respective divisional units (blocks) of data are caused to be large to record respective divisional data into respective HDDs as respective data blocks, and to record results obtained by taking exclusive logical sum of data blocks corresponding to each other of respective HDDs (parity data) into other respective HDDs as parity blocks to distribute those parity blocks into other respective HDDs.

FIG. 1 is a block diagram showing the fundamental configuration of RAID. This RAID 10 is of configuration comprising a SCSI protocol controller (hereinafter referred to as SPC) 1, a striping section 2, a unification section 3, a memory section 4, a SPC section 5, a HDD section 6, and a CPU 7. In this example, the HDD section 6 is composed of eight HDDs of $HDD_1 \sim HDD_8$. By taking, as an example, the case where SCSI (Small Computer System Interface) is employed as input/output interface of data, the configurations and the functions of respective sections will be described below.

The SPC 1 is input/output control means for carrying out management/control of input/output of data of the RAID 10, and its operation is controlled by the CPU 7. In addition, the SPCI is connected to an initiator 8 through the SCSI.

The striping section 2 is data distribution means for recording recording data inputted through the SPC 1 in a manner distributed to the $HDD_1 \sim HDD_8$ of the HDD section 6. Parity data are respectively added to data distributed to the respective HDDs.

The unification section 3 is data constructing means for constituting data which have been read out from the $HDD_1 \sim HDD_8$ of the HDD section 6 into single reproduction data.

The memory section 4 is buffer memory means for temporarily storing recording and/or reproduction data of the HDD section 6, and is constituted by using semiconductor memory elements.

The SPC section 5 is transfer control means for controlling data transfer between the HDD section 6 and the memory section 4, and is controlled by the CPU 7 similarly to the SPC 1.

The HDD section 6 is composed of eight HDDs of $HDD_1$ to $HDD_8$ as described above. For these HDDs, small diameter discs having diameter of 3.5 inches or diameter of 5.25 inches are ordinarily used. The same addresses are assigned (allocated) to the respective HDDs as described later. Data are recorded and/or reproduced in parallel.

The memory section 4 and the SPC section 5 both comprise $memory_1 \sim memory_8$ and $SPC_1 \sim SPC_8$ corresponding to the $HDD_1 \sim HDD_8$ of the HDD section 6. Further, data input/output operations of respective HDDs of the HDD section 6 are carried out through the memory section 4 and the SPC section 5.

Moreover, the initiator 8 is connected to the SPC 1 through the SCSI, and serves to issue respective various control commands to control the operation of the RAID 10.

At the time of recording input data into the RAID 10, parity codes are added to data inputted through the SPC 1 at the time of striping at the striping section 2. The parity code added data are distributed to the respective HDDs of the HDD section 6 through the SPC section 5. Moreover, at the time of reproducing data from the RAID 10, data are read out from the respective HDDs of the HDD section 6 by the procedure opposite to that at the time of recording, and reproduction data are constructed at the unification section 3.

In HDs of the $HDD_2 \sim HDD_8$ data are recorded in the state equally distributed in units called sector. Namely, in the RAID 10 of FIG. 1, data are equally distributed to respective sectors of $HDD_1 \sim HDD_8$ of the HDD section 6. Moreover, since the HDD section 6 takes the configuration of the above-described RAID-3 or RAID-5, even if any fault takes place in any one of the $HDD_1$~$HDD_8$ of the HDD section 6 so that normal data transfer cannot be carried out, necessary data are restored by using parity data from data recorded in a manner distributed to the remaining seven HDDs, thus making it possible to normally transfer data. Thus, also in the case where any fault takes place in one HDD, the RAID 10 can continue use without stopping the function.

However, in the case where there take place any faults in the same address of two HDDs or more among these $HDD_1$~$HDD_8$, there are instances where it would be impossible to restore necessary data to normally transfer data. For this reason, when a fault occurs in one HDD, there is carried out a defect processing to restore the data which could not be read out by fault before fault takes place in the second HDD to record, for a second time, hereinafter referred to as re-record as occasion may demand restored data into the normal alternative sector. This defect processing is carried out by "Reassign Block command" from the CPU 7.

FIG. 2 is a view for explaining the state where the defect processing is carried out by Reassign Block command. Namely, an approach is employed to re-register address of sector 21 where defect has taken place into another normal spare sector 30 prepared in advance (this processing will be referred to as Reassign hereinafter) thereafter to carry out data restore processing of defect sector 21 to re-record the restored data into spare sector 30 (this processing will be referred to as Rebuilt hereinafter). This spare sector 30 is provided at another track on the same disc, or is provided on another disc.

However, when the above-mentioned reassign block command is executed, only the defect sector 21 is reassigned to the spare sector 30. For this reason, the physical order on the disc of the sector address of the RAID 10 would be changed. For this reason, "seek+rotation standby" time would take place. Namely, since the physical order on the disc is changed, there takes place time required for moving the head to the spare sector 30 (seeking) when access to data is provided, and until a desired spare sector 30 is rotated to the head position (rotation standby). Accordingly, after execution of reassign block command, the data access time may be remarkably elongated. In the case where data to be transferred is video/audio data, etc. for which real time characteristic is required, necessary data cannot be transferred within a predetermined time, resulting in the cause that reproduced picture (image)/sound (speech) is disturbed.

Moreover, in the RAID constituted by using plural HDDs, respective HDDs transfer data in parallel, thereby making it possible to transfer data at a speed higher than transfer speed necessary for transferring picture or sound (speech) data of one channel. For example, in the case where high speed transfer of four times speed can be made, single RAID can carry out, in parallel, transfer of four data. Thus, four users of user A to user D can provide access at the same time.

FIG. 3 explains the state where data transfer of four times speed is being carried out in the RAID 10. Namely, four kinds of data of 1-1~1-2, 2-1~2-2, 3-1~3-2, 4-1~4-2 recorded on the disc are respectively read out at four times speed and are stored into the memory section 4. Further, the four kinds of data are respectively read out at one time speed from the memory section 4. When such an approach is employed, four users of user A to user D can provide access to different data at the same time.

However, in the RAID constituted as described above, in the case where the previously described reassign block command is executed, it is required to once stop the operation of the entirety of RAID to disconnect HDD for which defect processing is to be carried out. This is because the reassign block command is a command for providing access to one (body of) HDD. In the case where four users use single RAID 10 as shown in FIG. 3, four users must stop all works. For this reason, this is great limitation in use (working) of RAID.

DISCLOSURE OF THE INVENTION

This invention has been made in view of the above-described problems, and its object is to provide a data recording and/or reproducing method for RAID and a data recording and/or reproducing apparatus therefor which can carry out defect processing without stopping use (working), and adapted so that there is no possibility that there results low disc access speed after defect processing.

A data recording and/or reproducing method according to this invention is directed to a data recording and/or reproducing method in which tracks of respective discs of disc drive composed of plural discs are divided into plural blocks, and spare sectors consisting of a predetermined number of sectors are disposed (assigned) in advance at predetermined intervals between the blocks to distribute data to the disc drive to carry out recording and/or reproduction thereof, the method comprises a defect sector detection step of detecting defect sector of the disc drive, a defect sector registration step of registering address of the detected defect sector into defect list, and a reassign step of re-registering block including the defect sector into an alternative area by using the spare sector so that sectors are continuously disposed on the disc except for the defect sector on the basis of the defect list and correspondence relationship set in advance.

In the above-mentioned method, there are further mentioned a restoring step of restoring data of defect sector included at the re-registered block, and a rebuilt step of re-recording the restored data into the block re-registered in the alternative area.

In the reassign step, it is mentioned that when the number of the defect sectors is larger than the number of spare sectors, re-registration of block including the defect sector is carried out by using plural spare sectors.

Moreover, a data recording and/or reproducing apparatus according to this invention is directed to a data recording and/or reproducing apparatus in which tracks of respective discs of disc drive composed of plural discs are divided into plural blocks, and spare sectors consisting of a predetermined number of sectors are disposed (assigned) in advance at predetermined intervals between the blocks to distribute data to the disc drive to carry out recording and/or reproduction thereof, the apparatus comprises address napping means for storing correspondence relationship between logical sectors and physical sectors of the disc drive, defect sector memory means for detecting defect sector of the disc drive to store address of the detected defect sector, and reassign means for re-registering block including the defect sector so that sectors are continuously disposed except for the defect sector on the disc on the basis of the address mapping means and the defect sector memory means.

It is further mentioned that the above-mentioned apparatus further includes restoring means for restoring data of defect sector included in the re-registered block, and rebuilt means for re-recording the restored data into the block re-registered in the alternative area.

Moreover, it is mentioned that the apparatus further comprises memory means for storing recording and/or reproduction data of the plural disc drives, whereby when restored data re-recorded in the alternative area is reproduced, data are continuously read out from all sectors including spare sectors and defect sector or sectors within read-out designated range to store them into the memory means, and when the stored data is read out, data of the defect sector is deleted. Further, it is mentioned that when data are recorded into area including the defect sector or sectors, data are continuously written into all sectors including spare sectors and defect sector or sectors within write-designated range, and to write dummy data into the defect sector or sectors.

Thus, there is no possibility that there does not take place access degradation to the disc by the seek operation and rotation standby of the head after defect processing, and RAID can carry out interruption of defect processing while conducting ordinary operation. Namely, in use of multi-channel structure, only one channel among channels is used, thereby making it possible to carry out defect processing. Thus, it becomes unnecessary to stop use (working) of the remaining channels.

In addition, in the case where one channel can be used as channel dedicated to defect processing, when the initiator automatically conducts a control so as to issue defect processing command to this dedicated channel, the defect processing is automatically carried out. Thus, user can continue use (working) without becoming conscious of any defect.

BRIEF DESCRIPTION OF THE DRAWINGS

FIGS. 6A~D are views showing the configuration of RAID logic address mapping, HDD defect list, spare address list and RAID defect address list.

FIGS. 8A~E are RAID logic address mapping, HDD defect list, HDD spare list and RAID defect list to which reference is made in carrying out the above-mentioned replacement processing.

FIGS. 12A~C are views for explaining skip operation at the time of data read-out.

FIGS. 14A~C are views for explaining dummy data addition processing operation at the time of data writing.

BEST MODE FOR CARRYING OUT THE INVENTION

Preferred embodiments of a data recording and/or reproducing method and a data recording and/or reproducing apparatus according to this invention will now be described with reference to the attached drawings.

In this example, prior to concrete or practical description of this invention, the fundamental sector structure of HDD will be first described.

Figure 4:
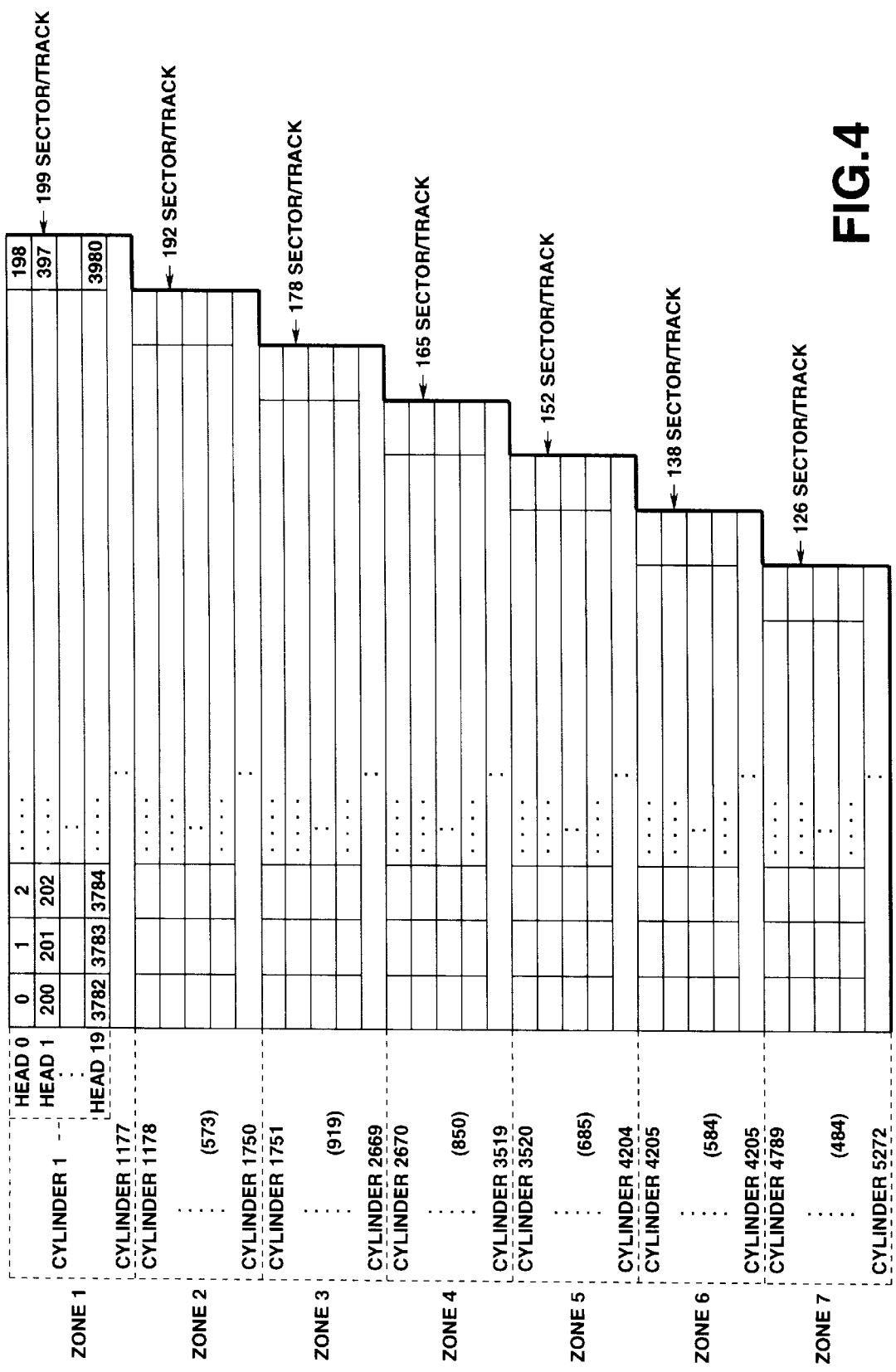
FIG. 4 is a view showing an example of the fundamental sector structure of HDD constituting RAID.

FIG. 4 shows an example of the fundamental sector structure of HDD constituting RAID. This HDD includes 10 HDs in total, and comprises 20 heads (head 0 to head 19) which provide access to the surface and the back of each HD.

Moreover, one disc is divided into seven zones of zone 1 to zone 7 from the outer circumference toward the inner circumference of the disc. Accordingly, as the position of the zone shifts to the inner circumferential side, the number of sectors of the zone becomes less.

Tracks belonging to the same zone are called cylinder and respective zones consist of plural cylinders. Namely, zone 1 consists of 1177 tracks (cylinders), the zone 2 consists of 573 tracks, . . . Accordingly, 5272 (cylinders) are provided at one disc. Further, heads of head 0 to head 19 provide access to respective cylinders and the respective heads provide access to respective tracks.

Figure 1:
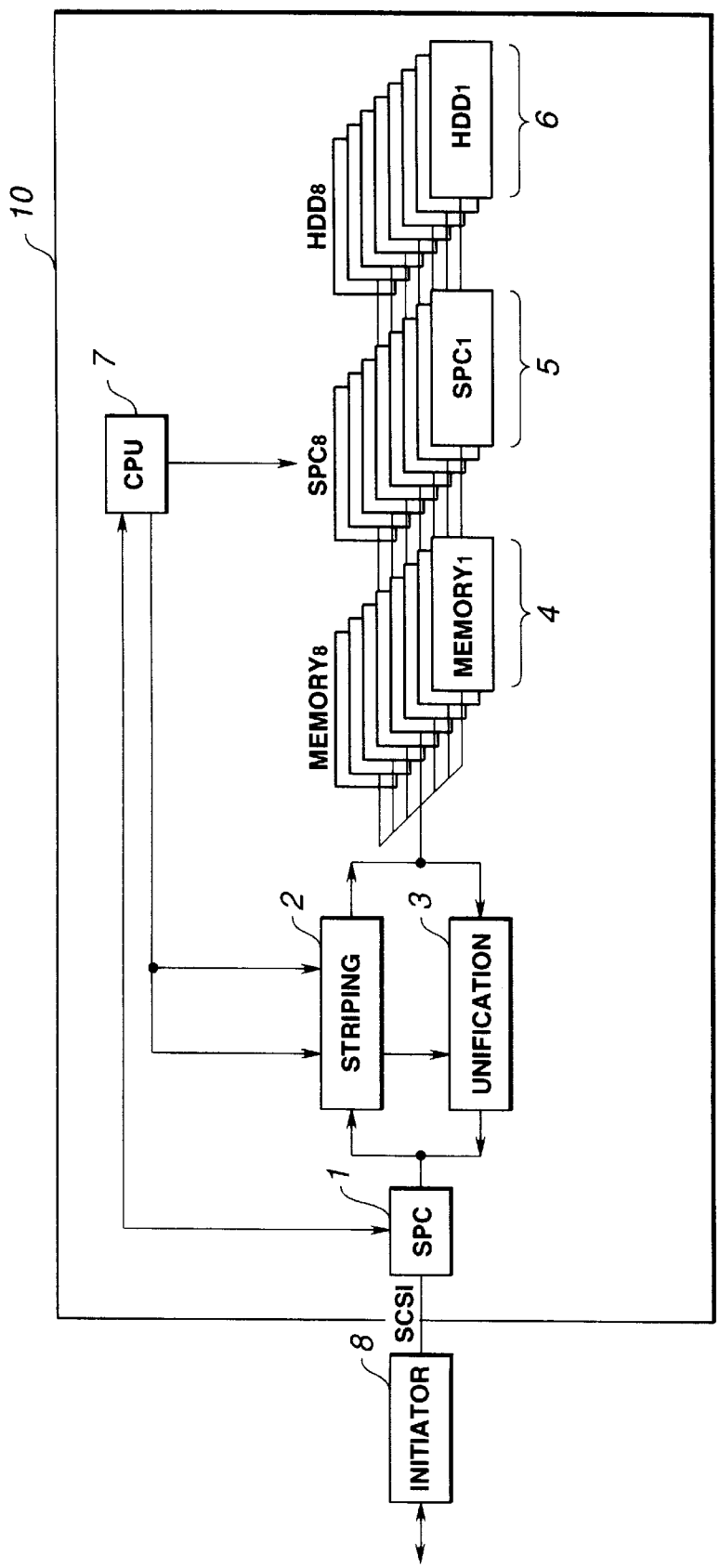
FIG. 1 is a block diagram showing the fundamental configuration of RAID.

The defect processing which is the feature of the data recording and/or reproducing method of this invention will now be described with reference to FIG. 1. When "Data Read (READ) command" or "Write (WRITE) command" is issued with respect to sector address of the RAID 10 from the initiator 8, the RAID 10 executes these commands with respect to sector address of respective HDDs of the HDD section 6 constituting corresponding sector. Ordinarily, address numbers of the RAID 10 and address numbers of respective HDDs of the HDD section 6 are caused to be the same. At the CPU 7, there are provided RAID logic address mapping table, defect address list of respective HDDs and defect address list of the RAID 10 corresponding thereto which will be described later. By using these lists, the defect processing is carried out.

Namely, the defect processing according to this invention is characterized in that, in place of mapping the defect sector into the alternative area so as to have one-to-one correspondence relationship, an approach is employed to make reference to the mapping table and the list described above to thereby carry out mapping by using spare sectors disposed at predetermined intervals every several sectors. This mapping will be mainly described.

Figure 5A:
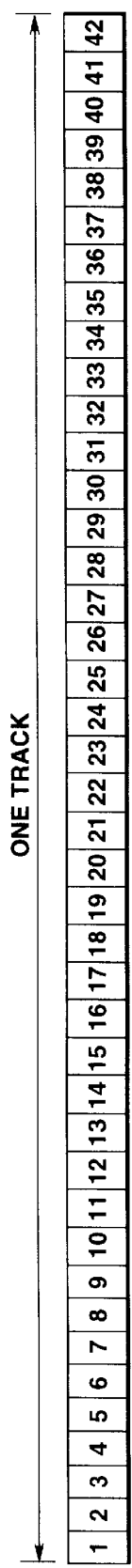
FIGS. 5A, B are views respectively showing examples of sector address assignment (allocation) with respect to HDD of RAID 10.
Figure 5B:
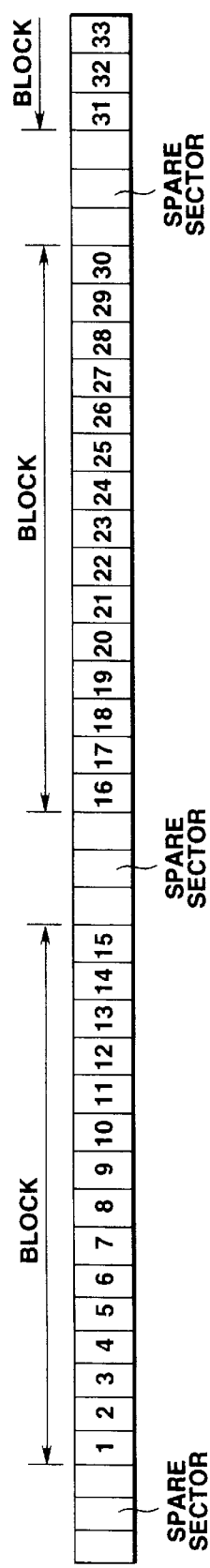

FIGS. 5A and 5B respectively show examples of assignment (allocation) to sector addresses to HDD of the RAID 10.

FIG. 5A shows assignment of sector addresses corresponding to one track of HDD. In this example, one track consists of 42 sectors.

FIG. 5B shows assignment (allocation) of RAID addresses with respect to the above-mentioned HDD sector addresses. With respect to sector address assignment (allocation) of RAID and sector address assignment of HDD, when, e.g., information corresponding to sector address of RAID is inputted in the state included in the command from the initiator 8 to RAID 10 as shown in FIG. 1, the CPU of the RAID 10 converts such information into sector addresses to the HDD to allow respective HDDs to execute commands with respect thereto. The sector address of RAID shown in FIG. 5B is sector address with respect to RAII) from the external of the RAID 10, and sector addresses of the HDD shown in FIG. 5A indicate addresses of respective HDDs when viewed from the inside of RAID. As shown in FIG. 5B, the sector address assignment (allocation) of RAID is such that certain continuous plural sectors are caused to be respective blocks to dispose several sectors at predetermined intervals as spare sectors between those blocks. In this example, there is shown the sector assignment (allocation) in the case where one track consists of 42 sectors, one block consists of 15 sectors, spare sector between blocks consists of 3 sectors, and spare sector between tracks is 6 sectors. It is to be noted that the number of sectors and the number of spare sectors of one block can be set in dependency upon parameters.

In the above-described example, for explanation, there is shown the example where one block consists of 15 sectors and spare sectors of 3 sectors are provided between blocks. In practice, however, since spare sectors of about 0.4~1% are prepared with respect to all data, spare sectors of 3~5 sectors are disposed every 300~500 sectors. Namely, data restoring processing with respect to defect sectors is carried out to re-record the restored data into the spare sector. In this case, when size of the block is caused to be too large, the memory capacity becomes too large for storing data when data is rebuilt. For this reason, this is not preferable. Such a block size which can be covered by the memory capacity such as about 512 K bytes is suitable.

Figure 2:
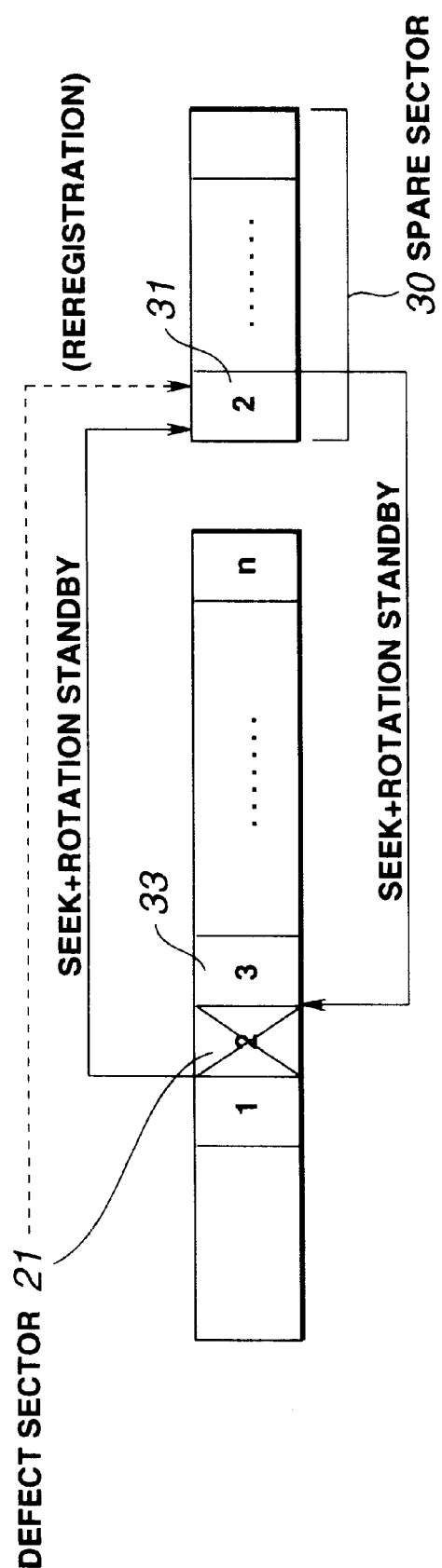
FIG. 2 is a view for explaining the state where the defect processing is carried out by reassign block command.

Further, when defect takes place in a certain sector of RAID 10, there is executed such a replacement processing that physical order of addresses of the RAID 10 is not changed by making reference to the RAID logic address mapping table and the defect list previously described. Unlike the conventional defect processing to replace only the defect sector into the spare sector as shown in FIG. 2, defect processing is carried out such that spare sector existing between blocks or defect sector produced within the block is well skipped. Thus, it is possible to prevent delay of data access by addition of "seek+rotation standby" time which has taken place after the conventional defect processing. This skip processing will be described later.

Moreover, since the above-mentioned processing can be caused to undergo execution processing as one of commands of the RAID 10, it is unnecessary to disconnect the HDD which carries out defect processing from RAID 10 for the purpose of providing access to one body of HDD where defect has taken place. Namely, since the CPU 7 carries out replacement processing with respect to respective HDDs by making reference to the mapping table and the list described above within the RAID 10 by one command to the RAID 10 through the initiator from the external, the HDD which carries out defect processing is not disconnected from the RAID 10. Accordingly, defect processing can be carried out without stopping the operation of the entirety of the RAID 10.

Figure 3:
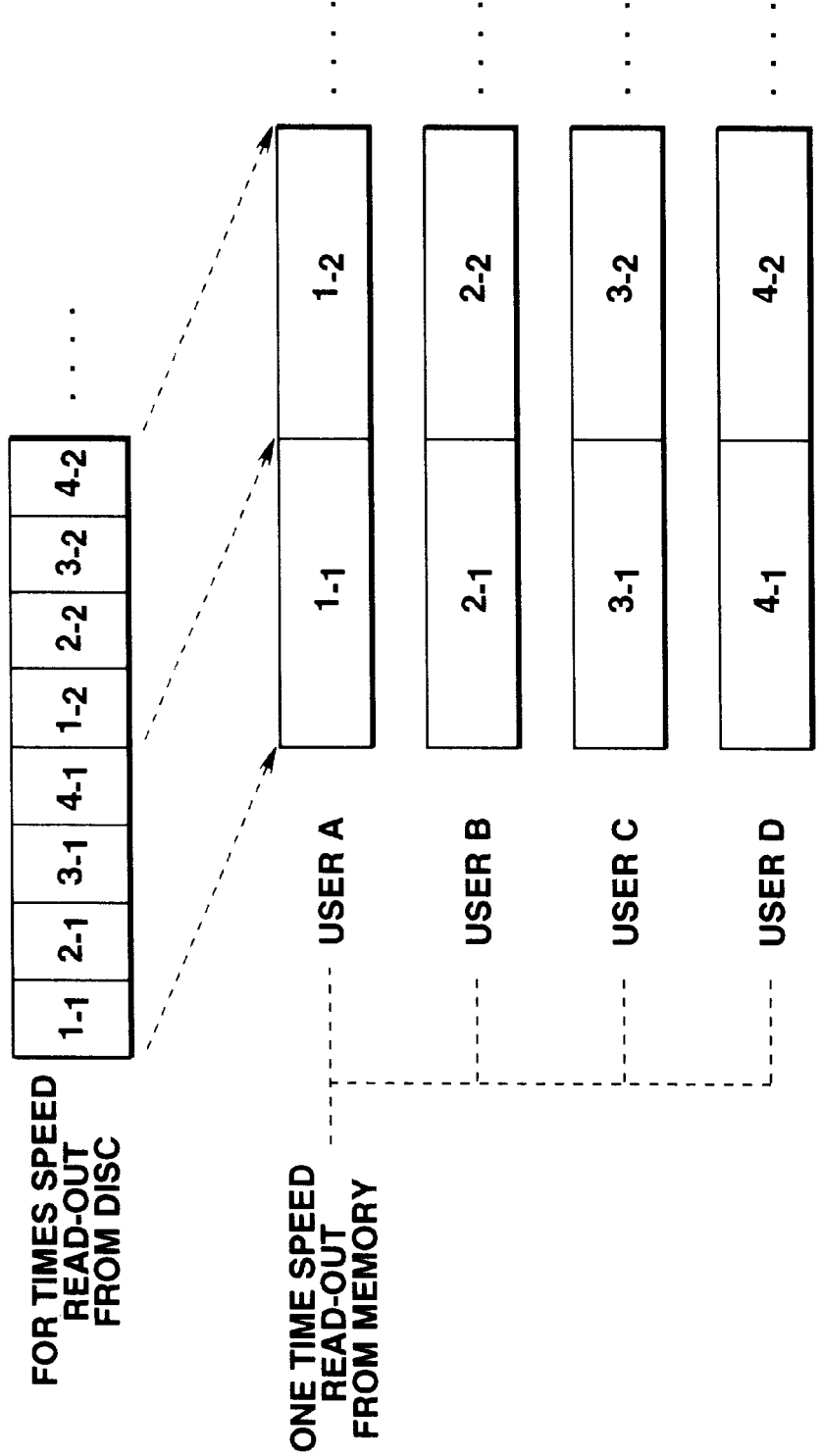
FIG. 3 is a view for explaining the state where data transfer of four times speed is carried out in the RAID 10.

For this reason, in the case where four users use one RAID as shown in FIG. 3, only one channel is used to carry out defect processing. Thus, the remaining 3 users can continue use (working). Further, in the case where channel for one user can be used as the channel dedicated to defect processing, if the initiator 8 conducts a control so as to automatically issue defect processing command for the dedicated channel at the time of issuance of defect, defect is automatically processed for a time period during which user uses (carries out working of) the RAID. Thus, user can continue use (working) of RAID without becoming conscious of occurrence of defect.

FIGS. 6A~D show the above-described RAID logic address mapping, and defect list and spare address list of HDD, and defect address list of RAID 10 corresponding thereto. These lists are stored into the CPU 7 as previously described. In practice, the CPU 7 is composed of a central processing unit, a ROM in which the above-described list, etc. is stored, and a RAM adapted so that data for operation is stored. In this embodiment, for simplifying the description, the central processing unit, the ROM and the RAM are collectively expressed as the CPU 7. Explanation thereof will be given below. At the time of occurrence of defect address, there is carried out replacement processing of sector so that physical order of addresses of the RAID 10 is not broken (is not changed) by making reference to the RAID logic address mapping and the defect list.

FIG. 6A shows the RAID logic address mapping table. This mapping table is a table for indicating the correspondence relationship between logic sector addresses of RAID 10 and sector addresses of respective HDDs of the HDD section 6 constituting the RAID 10.

FIG. 6B shows a HDD defect list. This list is a list for registering sector addresses of respective HDDs constituting RAID where any fault has taken place.

FIG. 6C shows a HDD spare list. This list indicates sector addresses assigned to RAID and sector addresses of respective HDDs corresponding to addresses assigned to spare sectors. Since, e.g., sector addresses of HDD corresponding to addresses assigned as spare sectors in FIG. 5B are 1, 2, 3 and 19, 20, 21 in FIG. 5A, these address values are registered in the spare list shown in FIG. 6C. These address values may be registered before all processing are carried out, or may be changed by instruction from the upper order (host) system during operation.

FIG. 6D shows RAID defect list. This list is a list for registering defect as RAID 10. Namely, this list is a list for registering each sector addresses of RAID corresponding to sector address of HDD where defect has taken place. When, e.g., there takes place defect in addresses 4, 5 of FIG. 5A, since addresses of corresponding RAID are 1, 2, these values are registered. The registered defect sectors are deleted (erased) after replacement processing.

In the case of carrying out defect processing by replacement of the sector, unless replacement processing is carried out so as to well skip spare sector disposed (assigned) between blocks or defect sector produced within the block, the previously described "seek+rotation stand" time would take place. As a result, it becomes impossible to prevent delay of data access. The procedure of this replacement processing will be described below.

Figure 7A:
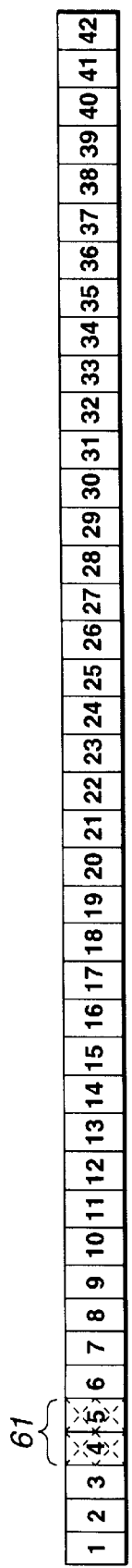
FIGS. 7A~C are views for explaining replacement processing in the case where the number of defect sectors is smaller than the number of one spare sector.
Figure 7B:
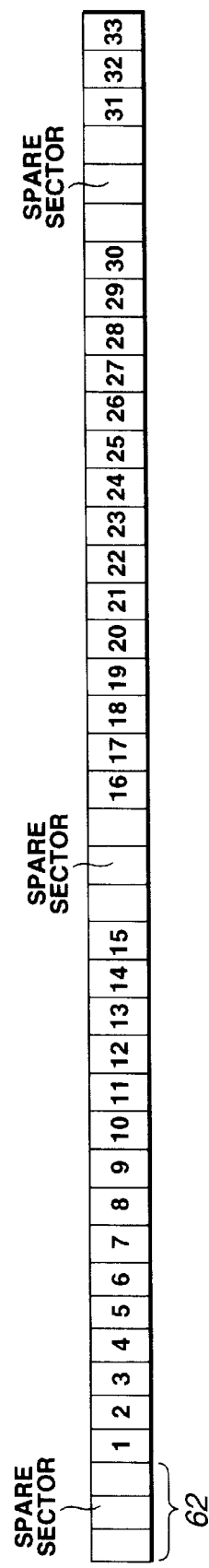
Figure 7C:
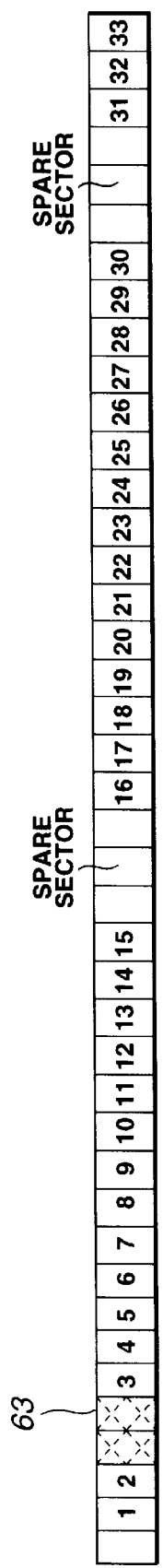

Let consider, as an example, the case where defects have taken place in sector addresses 4 and 5 of $HDD_1$ as shown in FIG. 7A. At this time, when the sector address assigned to the RAID 10 is assumed to be assigned as shown in FIG. 7B, 1, 2 sectors assigned as address of the RAID 10 with respect to the $HDD_1$ as shown in FIG. 7C are shifted to spare sector 62 consisting of three sectors disposed (assigned) at the leading portion of track to allow area 61 of 2 sectors where defects have taken place to be space (empty) area 63.

As stated above, in the case where the number of defect sectors is smaller than one spare sector number, sector is shifted to the spare sector within the same track, thereby making it possible to carry out replacement processing. In accordance with the replacement processing, since physical order of data within track on the disc is unchanged also after defect processing, extra seek time for providing access to spare sector, which was the problem of the conventional defect processing, does not take place. It is to be noted that the detail relating to read and write operations of data with respect to sector caused to be shifted will be described later.

FIGS. 8A~E show RAID logic address mapping table, HDD defect list, HDD spare list and RAID defect list to which reference is made in carrying out the above-mentioned replacement processing.

FIG. 8A is RAID logic address mapping before replacement processing, and FIG. 8B is RAID logic address mapping in which sector assignment (allocation) has been changed after the replacement processing. In area 71 of mapping before replacement processing, 4 and 5 are registered as sector address of $HDD_1$ where RAID address respectively correspond to 1 and 2. In area 72 of mapping after the replacement processing, sector addresses of $HDD_1$ where RAID sector addresses are 1 and 2 are respectively replaced into 2 and 3. Namely, by carrying out the above-described replacement processing, the content of the RAID logic address mapping table is rewritten in accordance with the processing.

FIG. 8C is HDD defect list and sector addresses 4, 5 of $HDD_1$ where defects have taken place are registered into area 73.

FIG. 8D is HDD spare list, wherein spare sector consisting of two sectors of $HDD_1$ used for replacement processing is deleted from area 74.

FIG. 8E is RAID defect list, wherein sector 1 and sector 2 which are RAID sectors where defects have taken place are registered. The registered defect sector are deleted after change of assignment (allocation).

The procedure of the above-described replacement processing using spare sector of one block will now be described.

Figure 9:
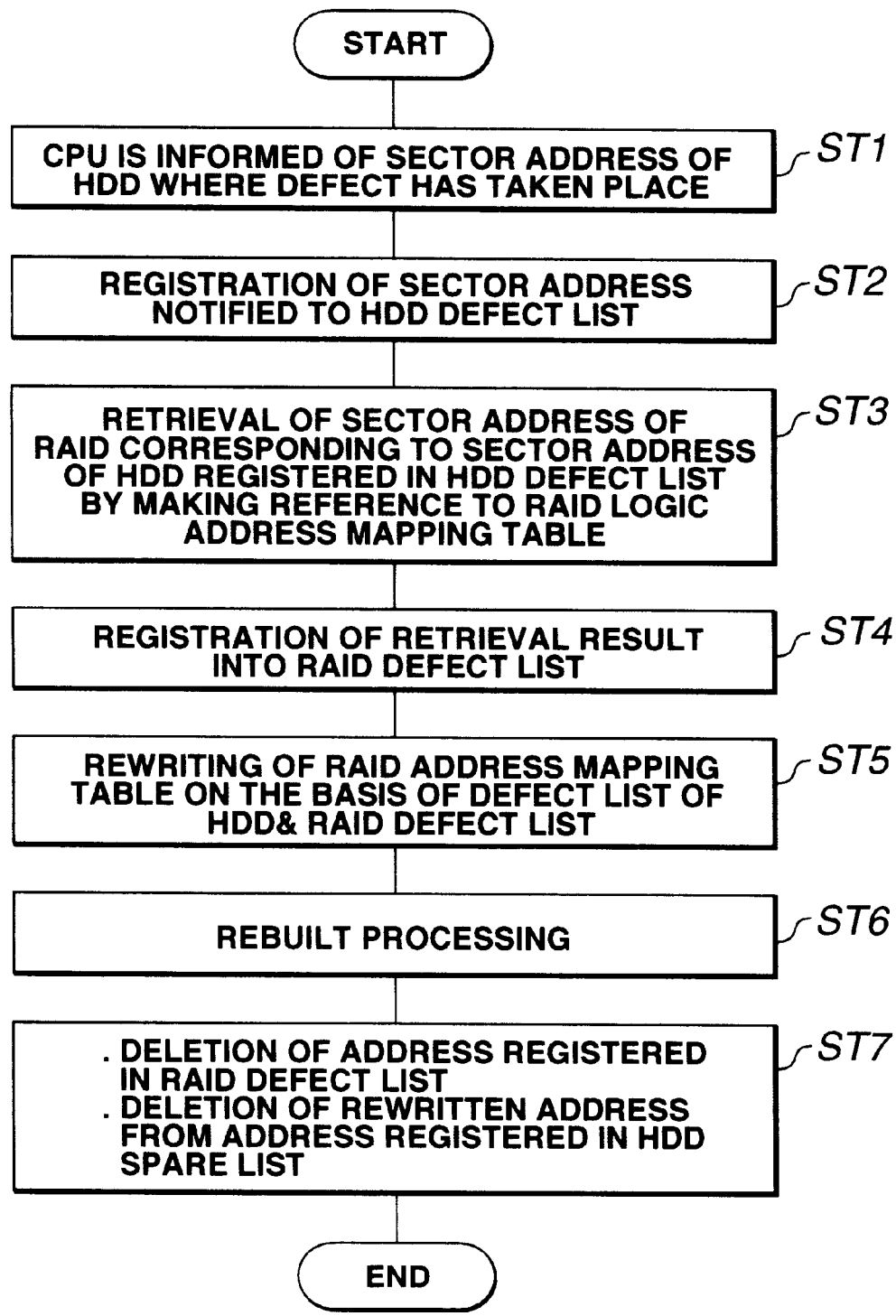
FIG. 9 is a flowchart showing procedure of replacement processing using spare sector of one block.

FIG. 9 is a flowchart showing the procedure of this replacement processing.

Initially, when the replacement processing of sector is started, the processing shifts to step ST1. At the step ST1, the CPU 7 is informed (notified) of sector address of HDD where defect has taken place. As notification to the CPU 7, command may be sent to respective HDDs via SPC from the CPU 7 so that they are notified as response with respect to this command, or respective HDDs may regularly send it to the CPU 7. Thus, notification is made on the basis of data so that occurrence of defect is notified to the CPU. In the example of FIGS. 7A~C, sector addresses 4, 5 of $HDD_1$ are notified to the CPU 7. Then, the processing shifts to step ST2.

At the step ST2, sector address which has been notified to the CPU 7 at the step ST1 is registered into the HDD defect list. In the example of FIGS. 7A~C, sector addresses 4, 5 of $HDD_1$ are registered. Accordingly, the list shown in FIG. 8C is prepared. Then, the processing shifts to step ST3.

At the step ST3, sector address of RAID corresponding to sector address registered in the HDD defect list at the step ST2 is retrieved by making reference to the RAID logic address mapping table. Then, at step ST4, retrieval result is registered into the RAID defect list. In the example of FIGS. 7A~C, the address mapping of FIG. 8A is retrieved from the list shown in FIG. 8C to obtain sector addresses 1 and 2 of RAID to register them into the RAID defect list of FIG. 8E.

Then, the processing shifts to step ST5. At the step ST5, the RAID address mapping table is rewritten on the basis of the above-described defect list.

In the above-described example, portion 71 encompassed by the frame of FIG. 8A is rewritten into portion 72 encompassed by the frame of FIG. 8B. Thus, the list of FIG. 8B is prepared.

Then, the processing shifts to step ST6 to carry out rebuilt processing. Namely, data of sector addresses 4, 5 of $HDD_1$ are restored to write the restored data into the sector addresses 2, 3 of $HDD_1$. Then, the processing shifts to step ST7.

At the step ST7, the address registered in the RAID defect list is deleted to erase (delete) the address in which the address registered in the HDD spare list has been rewritten by the mapping table. In the above-described example, sectors 1, 2 are deleted from the RAID defect list shown in FIG. 8E and the addresses of the mapping table rewritten as shown in FIG. 8B are deleted from FIG. 8D, i.e., the addresses 2, 3 of $HDD_1$ are rewritten. Accordingly, the addresses 2, 3 of $HDD_1$ of the spare list shown in FIG. 8D are deleted.

By the above-mentioned procedure, replacement processing using spare sector of one block is completed.

In the above-described replacement processing using spare sector of one block, in the case where the number of defect sectors is above the number of spare sectors, the defect processing fails to be carried out. In view of the above, in such a case, spare sectors of plural blocks are used to carry out similar replacement processing. The replacement processing using spare sector of plural blocks will now be described in more practical sense.

Figure 10A:
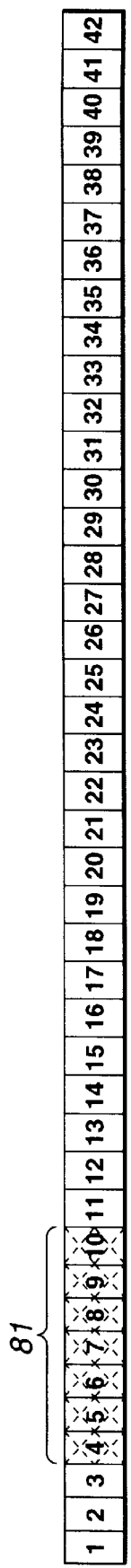
FIGS. 10A~C are views for explaining replacement processing using spare sector of plural blocks.
Figure 10B:
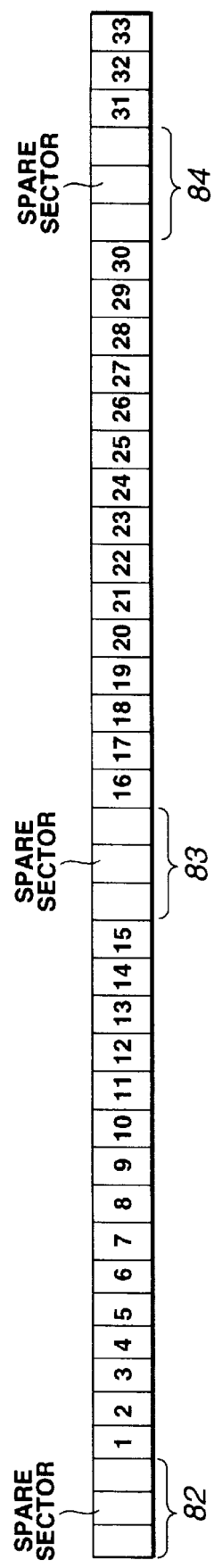

Consider, as an example, the case where defects have taken place over 7 sectors where the sector address of $HDD_1$ is 4 to 10 as shown in FIG. 10A. At this time, addresses of the RAID 10 are assigned as shown in FIG. 10B. This assignment (allocation) is similar to the case where replacement processing using spare sector of one block is carried out.

Sector addresses 1 to 3 of RAID are shifted to spare sector 82 of 3 sectors disposed at the leading portion of track to allow 3 sectors of defect sectors 4~6 to be space (empty) area. Moreover, spare sectors 83, 84 respectively consisting of 3 sectors are used to shift 4~30 sectors to allow four sectors of the defect sectors 7~10 to be space (empty) area. Thus, the area 81 consisting of 7 sectors where the defects have occurred to be space (empty) area 85 to change assignment (allocation) of the sector address of RAID.

In the case where the number of defect sectors is larger than one space sector number as stated above, plural spare sectors are used to shift sector data within the same track, thereby making it possible to carry out replacement processing. In accordance with this replacement processing, since physical order of data within track on the disc is not changed, extra seek time for providing access to spare sector, which was the conventional defect processing, does not take place.

FIGS. 11A~E respectively show the RAID logic address mapping, the HDD defect list, the HDD spare list and the RAID defect list to which reference is made in carrying out the above-mentioned replacement processing. These lists are constituted within the CPU 7 of the RAID 10 as previously described, and are similar to those to which reference is made in carrying out replacement processing using spare sector of one block.

Figure 10C:
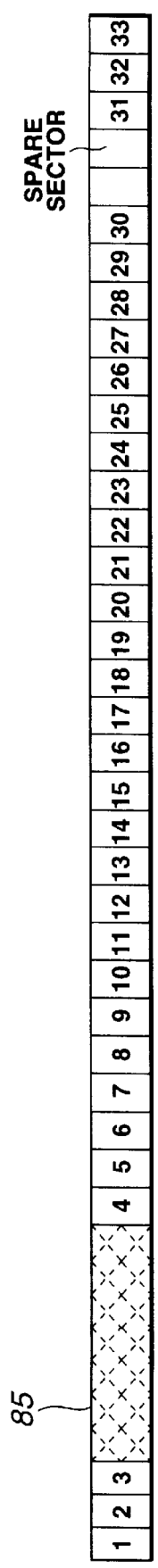
Figures 11A, 11B, 11C, 11D, 11E:
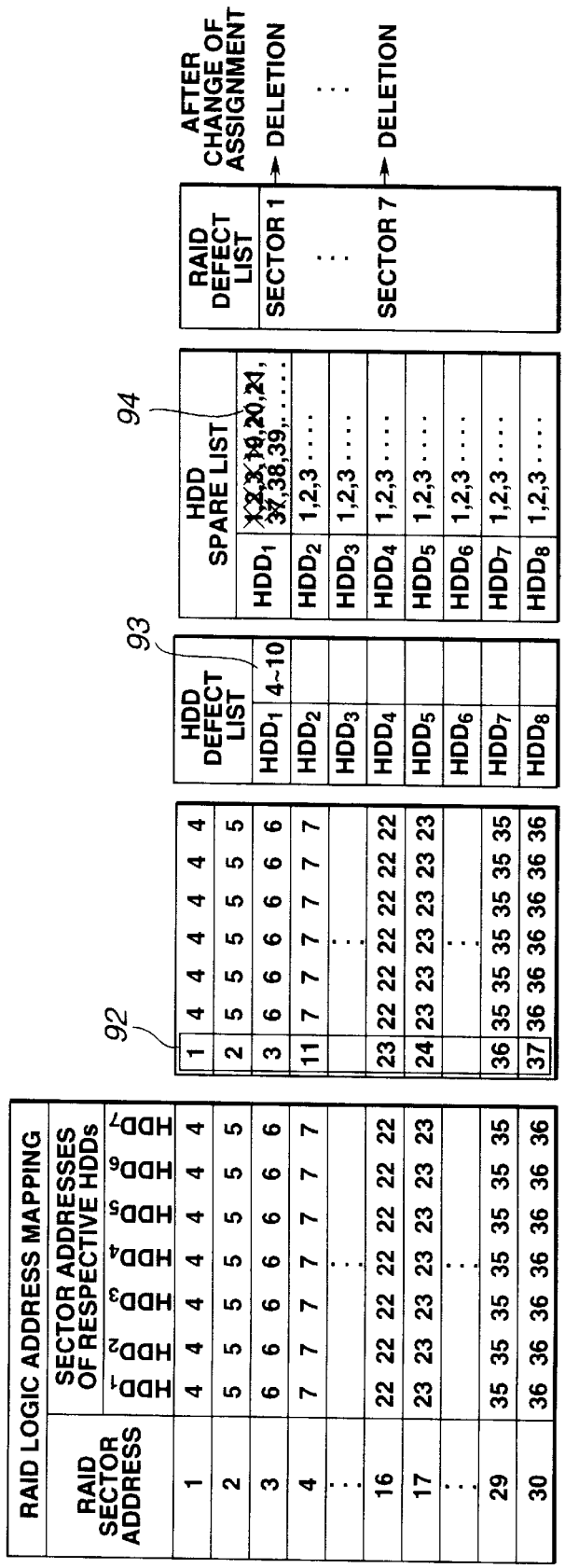
FIGS. 11A~E are RAID logic address mapping, HDD defect list, HDD spare list and RAID defect list to which reference is made in carrying out the replacement processing.

FIG. 11A is RAID logic address mapping before replacement processing, and FIG. 11B is RAID logic address mapping in which assignment (allocation) has been changed after the replacement processing. It is indicated that, in area 92 of mapping after replacement processing, 4~6 sectors which are defect sectors of $HDD_1$ where defects have occurred are replaced into 1~3 sectors, and defect sectors 7~10 are replaced into 11~14 sectors. This indicates that sector assignment of $HDD_1$ with respect to 1~3 sectors of RAID address of FIG. 10B is changed from sectors 4~6 of FIG. 10A to the original sectors 1~3 as shown in FIG. 10C. Similarly, it is indicated that sector assignment of $HDD_1$ with respect to 4~7 sectors of RAID addresses of FIG. 10B is changed from sectors 7~10 of FIG. 10A to the original sectors 11~14 as shown in FIG. 10C.

FIG. 11C is HDD defect list, wherein 4~10 sectors of $HDD_1$ where defects have taken place are registered in area 93.

FIG. 11D is HDD spare list, wherein 1, 2, 3, 19, 20, 21, 37 sectors which are spare sectors of 7 sectors of $HDD_1$ used in the replacement processing are deleted from area 94.

FIG. 11E is RAID defect list, wherein RAID sector addresses 1~7 where defects have taken place are registered. The registered defect sectors are deleted after change of assignment (allocation).

The procedure of the above-described replacement processing using spare sectors of plural blocks will now be described. In this case, the procedure itself of the replacement processing is the same as the procedure of the replacement processing using spare sectors of single block of FIG. 9.

Explanation will be given with reference to FIG. 9 for a second time in connection with the case where the replacement processing in the case where defects have taken place in seven sectors of 4~10 of the above-described $HDD_1$.

Initially, when the replacement processing is started, the processing shifts to step ST1. As a result, the CPU is informed of sector address of HDD where defect has taken place. In the above-described example, at step ST1 which notifies sector addresses 4~10 of $HDD_1$ where defects have taken place, the fact that defects have taken place in the 4, 5, 6, 7 sectors is notified to the RAID 10.

Then, the processing shifts to step ST2, at which sector addresses notified to the CPU 7 are registered into the HDD defect list. In the above-described example of FIGS. 10A~C, sector addresses 4~10 of $HDD_1$ are registered into the HDD defect list. Thus, the list shown in FIG. 11 is prepared.

Then, the processing shifts to step ST3 to retrieve corresponding sector addresses of the RAID by making reference to the RAID logic address mapping table to register the result retrieved at step ST4 into the RAID defect list. In the example of FIGS. 10A~C, corresponding RAID sector address is retrieved by the mapping table of FIG. 11A from the list of FIG. 11C to register addresses 1~7 which are results.

Then, the processing shifts to step ST5, at which the table is rewritten on the basis of two defect lists. In the above-described example, the RAID rewrites addresses of $HDD_1$ of addresses 1 to 30 of $HDD_1$.

Then, the processing shifts to step ST6 to carry out rebuilt processing to write restored data of addresses 4~36 of $HDD_1$ into the area of sector addresses 8~40 of $HDD_1$.

Then, the processing shifts to step ST7 to delete addresses 1~7 from the RAID defect list to delete 1, 2, 3, 19, 20, 21, 37 of the HDD spare list.

By the above-mentioned procedure, the replacement processing using spare sector of plural blocks is thus completed.

By changing the number of spare blocks to be used in dependency upon the number of defect sectors in this way, it is possible to cope with any defect by the sector replacement processing within the same track. However, in the case where the number of defects is large to such an extent that they cannot be processed even if plural spare sectors disposed (assigned) between tracks are used, there is shown a tendency such that defect is increased in an accelerated manner. In this case, it is not suitable (reasonable) to cope with such a case by the defect processing. Accordingly, it is necessary to exchange the disc.

When disc is exchanged, data is restored by rebuilt of the entire surface of the disc to be exchanged. Moreover, block size and the number of spare sectors between blocks can be set by parameters at the time of sector assignment. It is sufficient to change corresponding value to a suitable value in dependency upon the circumstances of occurrence of defect, etc.

Data read and data write operations when the above-described rewrite processing is carried out will now be described.

The operation when data is read out will be first described.

Let now consider as an example, for a second time, the case where defects have taken place in sector addresses 4, 5 of $HDD_1$. At this time, addresses of the RAID 10 are assigned as shown in FIG. 12B. In this example, there is shown the case where spare sector 104 is disposed also at the terminating end of track in addition to the spare sectors 102, 103 disposed at the leading portion of track and between blocks. At this time, as shown in FIG. 12C, there is carried out replacement processing to shift 1, 2 sectors to spare sector 102 consisting of three sectors disposed (assigned) at the leading portion of track to allow area 105 corresponding to two sectors where defects have taken place to be spare (empty) area.

For this reason, in the case where attempt is made to read out data of sectors 1~20 within the range indicated by the section (period) A among RAID addresses of FIG. 12B, the range including space area 105 indicated by section (period) A' of FIG. 12C is actually read out on the disc of $HDD_1$. At this time, when attempt is made to skip the space area 105 after the sectors 1, 2 have been read out, "rotation standby" time of disc is required for the purpose of detecting read-out start position of sector 3. Accordingly, extra time would be required for transfer of data.

In more practical sense, the RAID 10 attempts, by making reference to the RAID logic address mapping, to read out sectors 2 and 3, the sectors 6~18 and the sectors 22~26 of $HDD_1$, and to read out sectors 4~18 and sectors 22~26 of $HDD_2$. At this time, in order to carry out read-out operation in a manner to avoid defect sectors within block and spare sectors between blocks, when "Read" commands are issued in a divided (distributed) manner with respect to three areas of sectors 2 and 3, the sectors 6~8 and the sectors 22~26 of $HDD_1$ and two areas of sectors 4~8 and sectors 22~26 of $HDD_2$~$HDD_7$, rotation standby necessarily takes place between commands. As a result, the execution time is delayed.

In view of the above, in the data recording and/or reproducing method of this invention, the range from the sector 1 to the sector 20 of the section (period) A' is continuously read out in a manner to include space area 105 and spare sector 106 as well as to once store all data which have been read out into the memory section 4. Further, in reading out data stored in the memory section 4, data of the space area 105 and the spare sector 106 which are unnecessary data are deleted. The data thus obtained is outputted.

Also in the case where read-out range including space area after replacement processing is caused to undergo read-out designation by the above-mentioned skip processing, skip operation of defect sector and spare sector is not carried out in practice as the operation of one body of HDD. For this reason, data can be read out in minimum data access time in the state where "rotation standby" time of HDD does not take place.

The procedure when data read-out by the skip processing is carried out will now be described with reference to FIG. 13.

Figure 13:
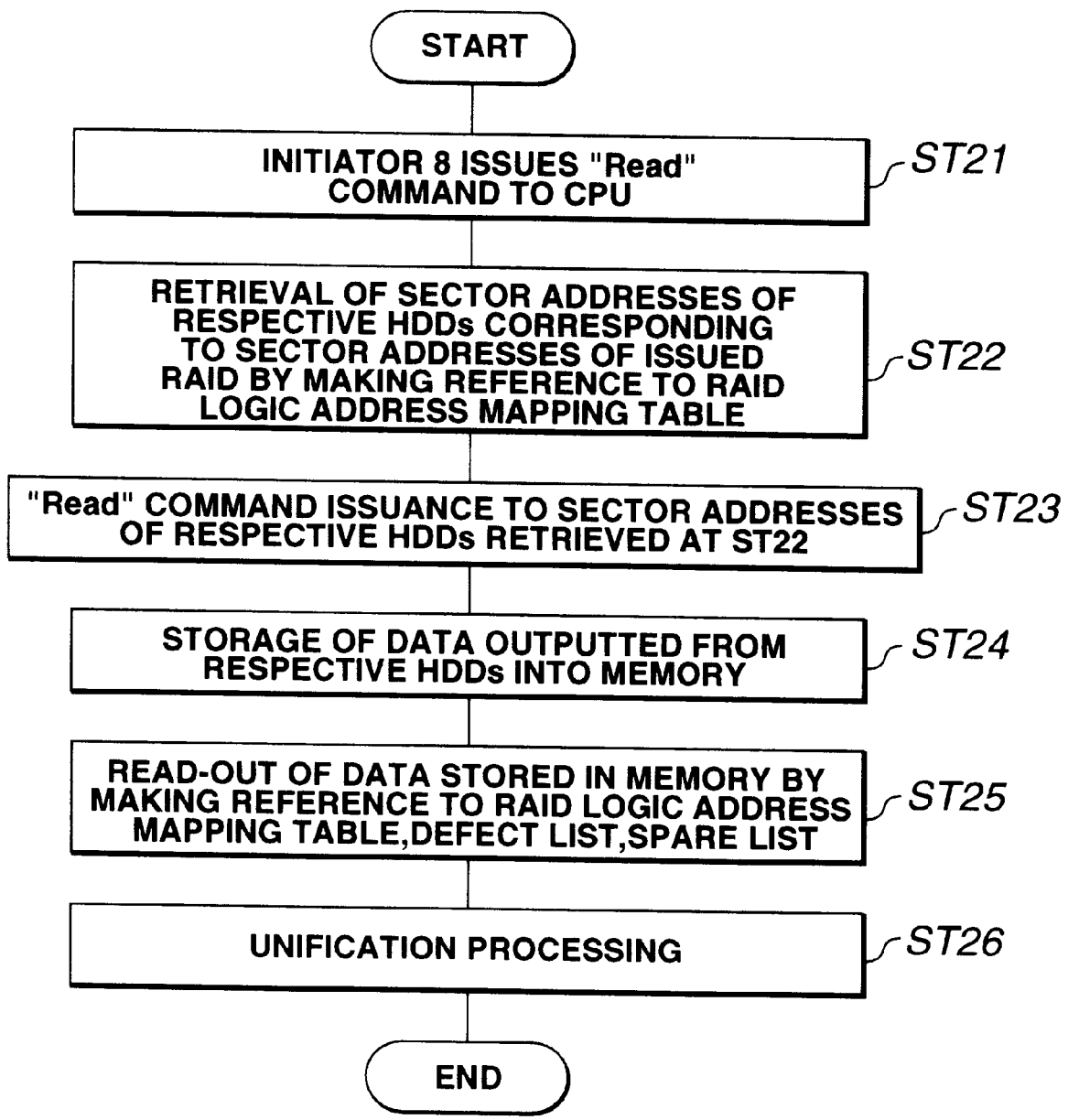
FIG. 13 is a flowchart showing the procedure of replacement processing and skip operation at the time of data read-out.

FIG. 13 is a flowchart showing the procedure of data read-out operation by this skip processing.

When this processing is started, the processing shifts to step ST21. At the step ST21, "Read" command is received from the initiator 8. In the above-described example, "Read" commands are issued with respect to sector addresses 1~20 of RAID. The CPU 7 receives these commands. Then, the processing shifts to step ST22.

At the step ST22, sector addresses of respective HDDs with respect to sector address of the issued RAID are retrieved by making reference to the RAID logic address mapping table thereafter to issue "Read" commands to respective HDDs retrieved at step ST23. In the example of FIGS. 12A~C, reference is made to the RAID logic address mapping shown in FIG. 8A. As a result, Read commands with respect to 1~20 sectors of RAID 10 are converted into "Read" commands to sectors 2~26 at $HDD_1$. At $HDD_2$~$HDD_7$, those commands are converted into "Read" commands to the sectors 4~26. Thus, "Read" commands are issued. Then, the processing shifts to step ST24.

At the step ST24, the data which have been read out from the respective HDDs are stored into the memory. Namely, the read operation is executed. The all data which have been read out are taken into the memory section 4. At this time, data of spare sector(s) and defect sector(s) are together taken into the memory section 4. Then, the processing shifts to step S25.

At the step ST25, the data stored in the memory is read out by making reference to the mapping table, the defect list and the spare list. Namely, data read-out operation within the memory section 4 is carried out. Thus, the data which has been read out is collated with the RAID logic address mapping and the defect/spare list to delete the defect sectors 4 and 5 and the spare sectors 19~21 within the range of sectors 2~26 to read out sectors in order of 2, 3, 6, ..., 18, 22, 23, ..., 26. In addition, the $HDD_2$~$HDD_7$ delete spare sectors 19~21 within the range of sectors 4~26 to read out sector data in order of 4, 5, 6, ..., 18, 22, 23, ..., 26.

Then, at step ST25, those sector data are caused to undergo unification and are outputted therefrom.

The operation at the time of writing data into respective HDDs will now be described.

Figures 14A, 14B, 14C:
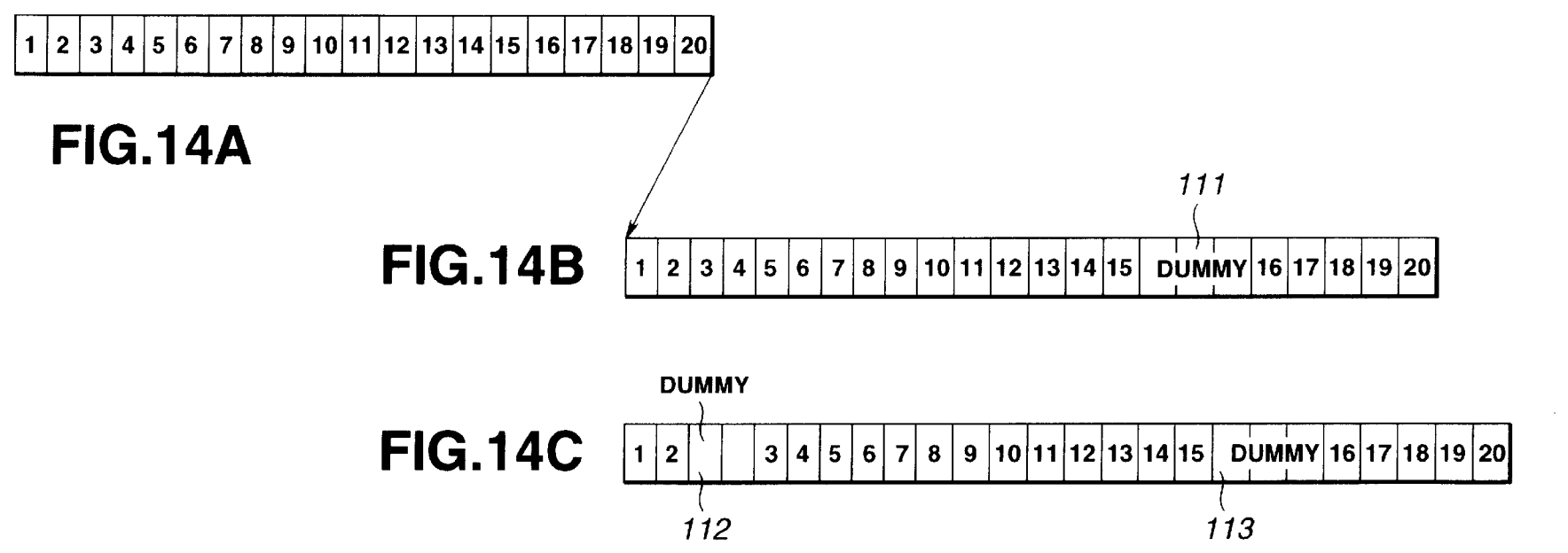

In the case where data consisting of 20 sectors of HDD as shown in FIG. 14A are written along order of sector addresses into the previously described RAID 10, those data are written into the range indicated by the section (period) A among RAID addresses of FIG. 12B at $HDD_2$~$HDD_7$, and are written into the range indicated by the section (period) A' of FIG. 12C on the disc of $HDD_1$.

FIG. 14B represents arrangement of data written into the range of sector addresses of the section (period) A, and FIG. 14C represents arrangement of data written into the range of sector addresses of the above-mentioned section (period) A'.

At this time, the RAID 10 makes reference to the RAID logic address mapping shown in FIG. 8A to attempt to write data with respect to sector addresses 2 and 3 (addresses 1 and 2 assigned to the RAID are 1~2), sector addresses 6~18 (3~15), and sector addresses 22~26 (16~20) of $HDD_1$, and with respect to sector addresses 4~18 (sector addresses assigned to RAID are 1~15) and sector addresses 22~26 (16~20). However, in order to avoid write operation into defect sector(s) within the block and spare sector(s) between blocks, if "Write" commands are separately issued with respect to three areas of sector addresses 2 and 3, 6~18 and 22~26 of $HDD_1$ and two areas of sector addresses 4~18 and 22~26 of $HDD_2$~$HDD_7$, rotation standby necessarily takes place between commands. As a result, the execution time is delayed.

In view of the above, in the data recording and/or reproducing method of this invention in the case where defect sector(s) or spare sector(s) is (are) included within the write designated range, such a control is conducted to dispose (assign) dummy data at data portions corresponding to the defect sector(s) or spare sector(s) to continuously carry out write operation thereof. Dummy data 111 of FIG. 14B and dummy data 112, 113 of FIG. 14C correspond to the above-mentioned dummy data.

By this dummy data addition processing, also in the case where the range including the defect sector(s) or the spare sector(s) is caused to undergo write designation, skip operation of defect sector(s) and spare sector(s) is not carried out in actual as the operations of respective HDDS. For this reason, "rotation standby" time of HDD does not take place. Thus, data can be written in minimum data access time.

The above-described procedure at the time of data writing will now be described with reference to FIG. 15.

Figure 15:
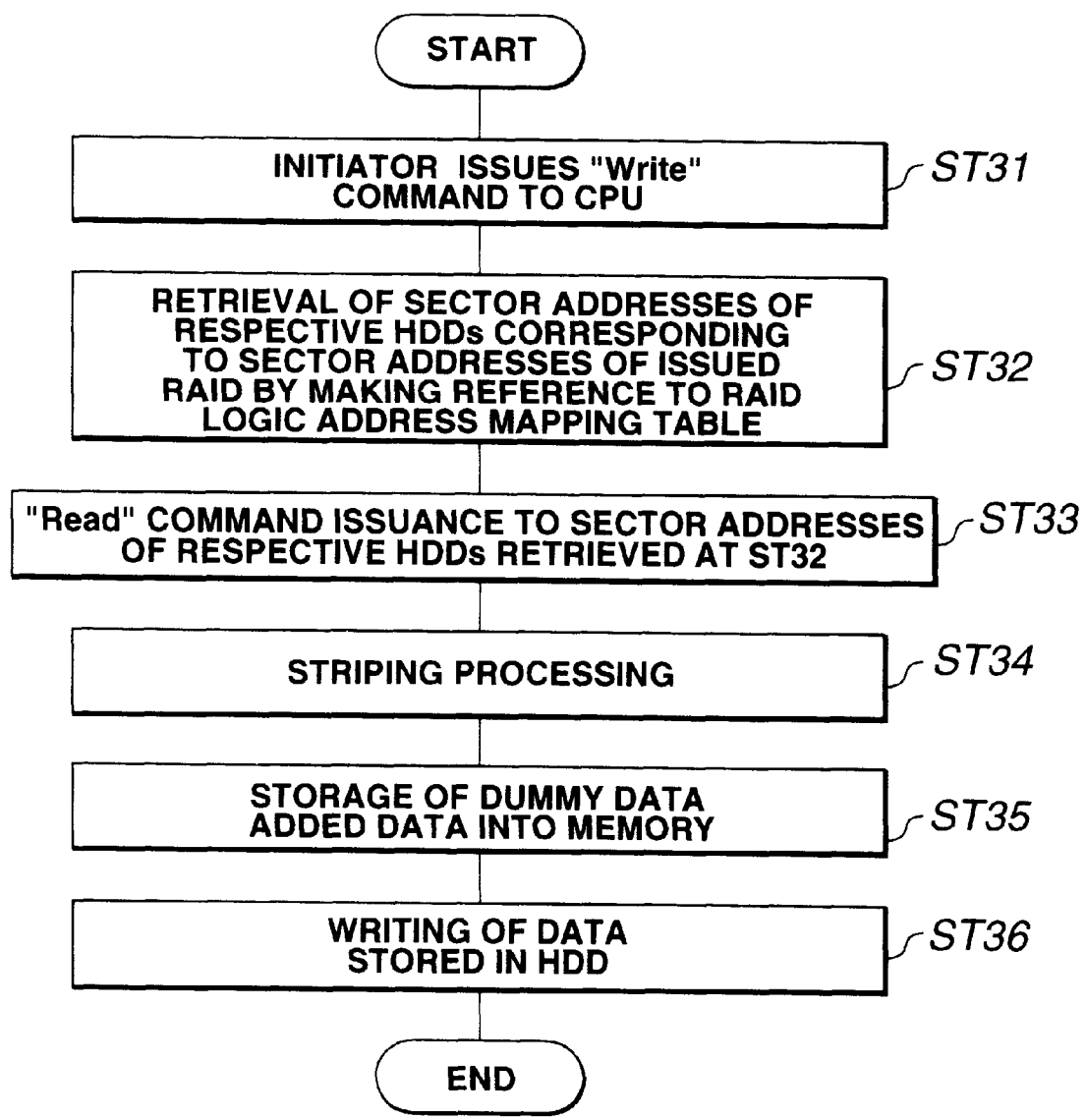
FIG. 15 is a flowchart showing the procedure of dummy data addition processing at the time of data writing.

FIG. 15 is a flowchart showing the procedure of this data addition processing.

Initially, when this processing is started, the processing shifts to step ST31.

At the step ST31, "Write" command is issued from the initiator to the CPU 7. In the example of FIGS. 14A to C, write command is issued from the initiator 8. Then, the processing shifts to step ST32.

At the step ST32, sector addresses of respective HDDs corresponding to sector addresses of the issued RAID are retrieved by making reference to the RAID logic address mapping. Then, at step ST33, "Write" (commands with respect to 1~20 sectors of RAID 10, in the example of FIG. 12, issued after undergone conversion into "Read" command to sector addresses of respective HDDs retrieved at the step ST32 are collated with the RAID logic address mapping. There are carried out conversion into "Write" command to sectors 2~26 at $HDD_1$, and there are carried out conversion into "Write" command to sectors 4~26 at $HDD_2$~$HDD_7$. Then, the processing shifts to step ST34.

At the step ST34, striping processing of input data is carried out. Then, at step ST35, dummy data is added. Thus, the dummy-data added data is stored into the memory. Namely, data corresponding to 20 sectors sent from the initiator 8 is caused to undergo striping. The data thus obtained is sent to the memory section 4 to conduct a control so as to add dummy data to the spare sector(s) and the defect sector(s) within the designated section (period).

At $HDD_1$, there is carried out such that when data of 2 sectors is sent, dummy data of 2 sectors is sent, whereupon when data of 13 sectors is sent, dummy data of three sectors are sent thereafter to write data of the remaining 5 sectors into the sectors 2~26.

At $HDD_2$~$HDD_7$, there is carried out a control such that when data of 15 sectors is sent, dummy data of 3 sectors are sent thereafter to send data of the remaining 5 sectors to the memory section 4 thereafter to write data of 23 sectors in total sent to the memory section 4 into the sectors 4~26 of HDD in order.

Then, the processing shifts to step ST36 to write data within the memory section 4 into the HDD. Thus, the processing is completed.

In accordance with the above explained data recording and/or reproducing method and the data unit data write/read procedure of the embodiment according to this invention, they are applied to RAID, thereby making it possible to carry out defect processing without stopping its operation, and there is no possibility that disc-access speed is lowered after defect processing.

Accordingly, there is no access degradation to the disc by the seek operation and the rotation standby operation of the head after defect processing. In addition, interruption of defect processing can be made while the RAID is carrying out an ordinary operation. Namely, in the form where multi-channel structure is used, only one channel among them is used, thus making it possible to carry out defect processing. As a result, it becomes unnecessary to stop use (working) of the remaining channels.

Further, in the case where one channel can be used as channel dedicated to defect processing. when the initiator 8 conducts a control so as to automatically issue defect processing command to this dedicated channel, the defect processing is automatically carried out. Thus, a user can continue use (working) without becoming conscious of defect in any sense.

It is to be noted that this invention is not limited only to the above-described embodiments, but it is a matter of course to carry out various modifications (changes) within the range which does not depart from this invention.

What is claimed is:

1. A data recording and/or reproducing method in which tracks of respective discs of a disc drive having plural discs are divided into plural blocks, and wherein spare sectors each containing a predetermined number of track sectors are assigned in advance between the blocks to distribute data to the disc drive to carry out a recording and/or reproducing operation thereof, the method comprising:

detecting a defect sector of the disc drive;

registering an address of the detected defect sector into a defect list;

re-registering a block including the defect sector into an alternative area by using the spare sector so that track sectors for storing data in the vicinity of the defect sector are arranged continuously on the disc, with the exception of the defect sector, on the basis of the defect list and a correspondence relationship set in advance;

restoring data of the defect sector included in the re-registered block; and re-recording the restored data into the block re-registered in the alternative area;

wherein when restored data re-registered in the alternative area is reproduced, data are continuously read out from all sectors including at least one spare sector and at least one defect sector within a read-designated range to store those data into a memory, and when data stored in the memory is read out, data of the at least one defect sector is deleted.

2. A data recording and/or reproducing method as set forth in claim 1, wherein, at the re-registering step, if the number of defect sectors is larger than the number of the spare sectors, re-registration of a block including the defect sector is carried out by plural spare sectors.

3. A data recording and/or reproducing method in which tracks of respective discs of a disc drive having plural discs are divided into plural blocks, and wherein spare sectors each containing a predetermined number of track sectors are assigned in advance between the blocks to distribute data to the disc drive to carry out a recording and/or reproducing operation thereof, the method comprising:

detecting a defect sector of the disc drive;

registering an address of the detected defect sector into a defect list;

re-registering a block including the defect sector into an alternative area by using the spare sector so that track sectors for storing data in the vicinity of the defect sector are arranged continuously on the disc, with the exception of the defect sector, on the basis of the defect list and a correspondence relationship set in advance;

restoring data of the defect sector included in the re-registered block;

re-recording the restored data into the block re-registered in the alternative area;

wherein when data is recorded into an area including the defect sector, data are continuously written into all sectors including at least one spare sector and at least one defect sector within a write-designated range and dummy data is written into the at least one defect sector.

4. A data recording and/or reproducing apparatus in which tracks of respective discs of a disc drive having plural discs are divided into plural blocks, and spare sectors each containing a predetermined number of track sectors are assigned in advance at predetermined intervals between the blocks to distribute data to the disc drive to carry out a recording and/or reproducing operation thereof, the apparatus comprising:

address mapping means for storing a correspondence relationship between logical sectors and physical sectors of the disc drive;

defect sector detection and storage means for detecting a defect sector of the disc drive and storing an address of the defect sector;

reassign means for re-registering a block including the defect sector into an alternative area by using the spare sector so that track sectors for storing data in the vicinity of the defect sector are arranged continuously on the disc with the exception of the defect sector, on the basis of the address mapping means and the stored defect sector address; and memory means for storing recording and/or reproduction data of the plural disc drives, whereby when restored data re-recorded in the alternative area is reproduced, data are continuously read out from all sectors including at least one spare sector and at least one defect sector within a read-designated range to store the continuously read data into the memory means, and when the stored data is read out, data of the at least one defect sector is deleted.

5. A data recording and/or reproducing apparatus as set forth in claim 4, wherein when data is recorded into an area including the defect sector, data are continuously written into all sectors including one or more spare sectors and one or more defect sectors within a write-designated range, and dummy data is written into the one or more defect sectors.

6. A data recording and/or reproducing apparatus in which tracks of respective discs of a disc drive having plural discs are divided into plural blocks, and spare sectors each containing a predetermined number of track sectors are assigned in advance at predetermined intervals between the blocks to distribute data to the disc drive to carry out a recording and/or reproducing operation thereof, the apparatus comprising:

address mapping means for storing a correspondence relationship between logical sectors and physical sectors of the disc drive;

defect sector detection and storage means for detecting a defect sector of the disc drive and storing an address of the defect sector;

reassign means for re-registering a block including the defect sector into an alternative area by using the spare sector so that track sectors for storing data in the vicinity of the defect sector are arranged continuously on the disc, with the exception of the defect sector, on the basis of the address mapping means and the stored defect sector address; and wherein when data is recorded into an area including at least one said defect sector, data are continuously written into all sectors including at least one spare sector and the at least one defect sector within a write-designated range, and dummy data is written into the at least one defect sector.

7. A data recording method in which tracks of respective discs of a disc drive having plural discs are divided into plural tracks, with each track being divided into track sectors, the method comprising:

defining blocks on said disc drive for data storage, each block containing a plurality of track sectors;

defining spare sectors on said tracks, each spare sector containing at least one of said track sectors;

detecting a defect sector of the disc drive, and registering an address of the detected defect sector in a defect list;

re-assigning a block including the defect sector into an alternative area by using a spare sector, on the basis of at least the defect list; and recording dummy data into the defect sector, to enable data to be subsequently read continuously from track sectors of the re-assigned block situated before, within and after the defect sector, with the dummy data being read from the defect sector.

8. The data recording method of claim 7, wherein at least some of said tracks each contain a plurality of said spare sectors and at least one of said blocks.

9. The data recording method of claim 8, wherein at least one of said spare sectors is disposed between blocks of a common track.

10. A data reproducing method for reproducing data from a disc drive having plural discs, each disc having tracks divided into track sectors, wherein blocks have been defined on the disc drive for data storage, each block containing a plurality of track sectors, and spare sectors have been defined on said tracks, each spare sector containing at least one of said track sectors, and blocks have been re-assigned to alternative areas in accordance with a defect list containing addresses of defect sectors, the method comprising:

consulting said defect list to determine addresses of said defect sectors;

continuously reading out data from track sectors of a re-assigned block within a read-designated range that includes a defect sector;

storing the continuously read data in a memory; and deleting the data read out from the defect sector when the stored data is read out from the memory.

11. The data reproducing method of claim 10, wherein at least some of said tracks each contain a plurality of said spare sectors and a least one of said blocks.

12. The data reproducing method of claim 10, wherein at least one of said spare sectors is disposed between blocks of a common track.

* * * * *